(12) United States Patent
David et al.

(10) Patent No.: US 11,981,213 B2
(45) Date of Patent: May 14, 2024

(54) ELECTRIC DRIVETRAIN AND METHOD FOR OPERATION OF SAID DRIVETRAIN

(71) Applicant: Dana Heavy Vehicle Systems Group, LLC, Maumee, OH (US)

(72) Inventors: Jeffrey M. David, Cedar Park, TX (US); Travis J. Miller, Austin, TX (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 550 days.

(21) Appl. No.: 17/334,528

(22) Filed: May 28, 2021

(65) Prior Publication Data

US 2022/0379737 A1 Dec. 1, 2022

(51) Int. Cl.
*B60K 1/02* (2006.01)
*B60K 6/365* (2007.10)
*B60K 17/04* (2006.01)
*B60K 25/02* (2006.01)
*B60L 1/00* (2006.01)
*B60L 15/20* (2006.01)
*F16H 59/36* (2006.01)
*F16H 59/44* (2006.01)
*B60K 6/26* (2007.10)

(52) U.S. Cl.
CPC .............. *B60L 15/20* (2013.01); *B60K 1/02* (2013.01); *B60K 17/046* (2013.01); *B60K 25/02* (2013.01); *B60L 1/00* (2013.01); *F16H 59/36* (2013.01); *F16H 59/44* (2013.01); *B60K 6/26* (2013.01); *B60K 6/365* (2013.01); *B60K 2025/022* (2013.01); *B60L 2240/421* (2013.01); *B60L 2260/167* (2013.01); *B60L 2260/20* (2013.01); *B60L 2260/22* (2013.01); *B60Y 2200/91* (2013.01); *B60Y 2200/92* (2013.01); *B60Y 2400/60* (2013.01); *B60Y 2400/73* (2013.01); *F16H 2059/366* (2013.01); *F16H 2059/446* (2013.01)

(58) Field of Classification Search
CPC . B60K 1/02; B60K 1/17; B60K 1/046; B60K 25/02; B60K 6/26; B60K 6/365; B60K 2025/022; B60L 15/20; B60L 1/00; B60L 1/224

See application file for complete search history.

(56) References Cited

U.S. PATENT DOCUMENTS 7,256,510 B2  8/2007  Holmes et al.
7,448,460 B2  11/2008  Morrow et al.
(Continued)

FOREIGN PATENT DOCUMENTS

CN    107215203 A    9/2017
WO    2019195229 A1  10/2019

*Primary Examiner* — Tinh Dang
(74) *Attorney, Agent, or Firm* — McCoy Russell LLP (57) ABSTRACT

Methods and systems are provided for an electric drivetrain. In one example, the electric drivetrain system includes a first and a second electric motor-generator rotationally coupled to a planetary assembly that is rotationally coupled to a drive axle via an output gear. The system further includes a controller that is configured to, during a first operating condition, operate each of the first and second electric motor-generators in a motor mode or a generator mode and hold the output gear at a zero speed.

20 Claims, 4 Drawing Sheets

(56) References Cited

U.S. PATENT DOCUMENTS

| | | | |
|---|---|---|---|
| 7,491,144 B2 | 2/2009 | Conlon | |
| 9,109,674 B2* | 8/2015 | Duhaime | F16H 3/725 |
| 2005/0252703 A1* | 11/2005 | Schmidt | B60W 10/06 |
| | | | 180/65.235 |
| 2008/0230284 A1 | 9/2008 | Schoon | |
| 2009/0124451 A1* | 5/2009 | Rask | B60K 6/365 |
| | | | 477/3 |
| 2010/0114424 A1* | 5/2010 | Morris | F16H 59/68 |
| | | | 701/51 |
| 2012/0065014 A1* | 3/2012 | Puiu | F16H 37/065 |
| | | | 475/5 |
| 2013/0203551 A1 | 8/2013 | Mellet et al. | |
| 2015/0298574 A1 | 10/2015 | Bramson | |
| 2017/0284517 A1* | 10/2017 | Rekow | B60W 30/18063 |
| 2018/0066748 A1* | 3/2018 | Hu | F16H 61/0213 |
| 2020/0023734 A1 | 1/2020 | Crotti et al. | |
| 2021/0095744 A1 | 4/2021 | David et al. | |

* cited by examiner

ELECTRIC DRIVETRAIN AND METHOD FOR OPERATION OF SAID DRIVETRAIN

TECHNICAL FIELD

The present description relates generally to methods and systems for an electric drivetrain.

BACKGROUND AND SUMMARY

Some electric drivetrains are constrained to a fixed motor speed for a given road speed. This drivetrain arrangement constrains opportunities for efficiency gains, restricts region of constant torque operation, and constrains regenerative performance. In an attempt to increase drivetrain performance, multi-speed gearboxes are deployed in certain vehicles to provide a ratio selection functionality which may come at the expense of additional hardware and inherent torque disturbances during shifts. Other attempts have been made to provide dual-motor drivetrains in which the motors may be asymmetrically sized. Even further, infinitely variable transmissions (IVTs) and power take-offs (PTOs) have been used in selected vehicles in an attempt to further increase vehicle efficiency and expand the vehicle's auxiliary system capabilities.

The inventors have recognized several drawbacks with previous electric drivetrains and PTO arrangements. For instance, hybrid electric vehicles have attempted to include PTOs using electric PTO assemblies that are separate from motor in the hybrid powertrain. However, the electric PTOs may increase manufacturing costs, the drivetrain's profile, and maintenance demands.

U.S. Pat. No. 7,448,460 B2 to Morrow et al. teaches hybrid vehicle that includes a self-contained axle module with a single electric motor and a PTO. The inventors have recognized several drawbacks with Morrow's axle module and other vehicle drivetrains. For instance, the self-contained axle module relies on the variable speed motor to adjust wheel speed and does not includes adjustable gear ratios. Consequently, the vehicle's efficiency and performance may be decreased. Further in the self-contained axle module, a convoluted gear train is used to attach the PTO to a differential assembly. Other vehicles have used electric PTOs formed separately from hybrid drive systems, adding complexity to the vehicle.

In one example, the issues described above may be addressed by an electric drivetrain system. The system includes a first and a second electric motor-generator. The electric motor-generators are rotationally coupled to a planetary assembly. Further, the planetary assembly is rotationally coupled to a drive axle via an output gear. The electric drivetrain system further includes a controller configured to, during a first operating condition, operate each of the first and second electric motor-generators in a motor mode or a generator mode and hold the output gear at a zero speed. In this way, the motor-generators may be operated to generate mechanical and/or electric power for auxiliary system use. For instance, when the first electric motor-generator is operated in the motor mode it may transfer mechanical power from the first electric motor-generator to a mechanical PTO, in one example. The motor-generator may therefore efficiently provide a dual-use functionality: generating tractive power during drive mode, and mechanical power for auxiliary systems while the transition output is held at zero speed. Further, in one example, while the output gear is held at zero speed, the second electric motor-generator may be in the generator mode and transferring electrical energy to an electrically powered auxiliary vehicle system. In this manner, the second motor-generator may function to efficiently electrically power the auxiliary system while the vehicle is stationary.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A drivetrain system with expanded power take-off (PTO) capabilities. Specifically, the system may use an infinitely variable transmission (IVT) that includes two motor-generators coupled to two separate gears (e.g., a sun gear and a ring gear) in a planetary assembly. When mechanical and/or electric power is demanded by auxiliary vehicle systems, the motor-generators are operated, in speed control modes, to keep the planetary assembly's output gear (e.g., carrier) at zero speed. While keeping the output at zero speed, one or both of the motor-generators may provide power to a PTO that is attached to a mechanically powered auxiliary system. Additionally or alternatively, one or both of the motor-generators may supply electrical energy to an electrically powered auxiliary system while the output speed is kept near zero. In this way, auxiliary vehicle systems may be efficiently operated while the vehicle is stationary using the traction motors. Consequently, additional motors used to power the PTO may be forgone to reduce the system's complexity, size, and increase system durability.

Figure 1:
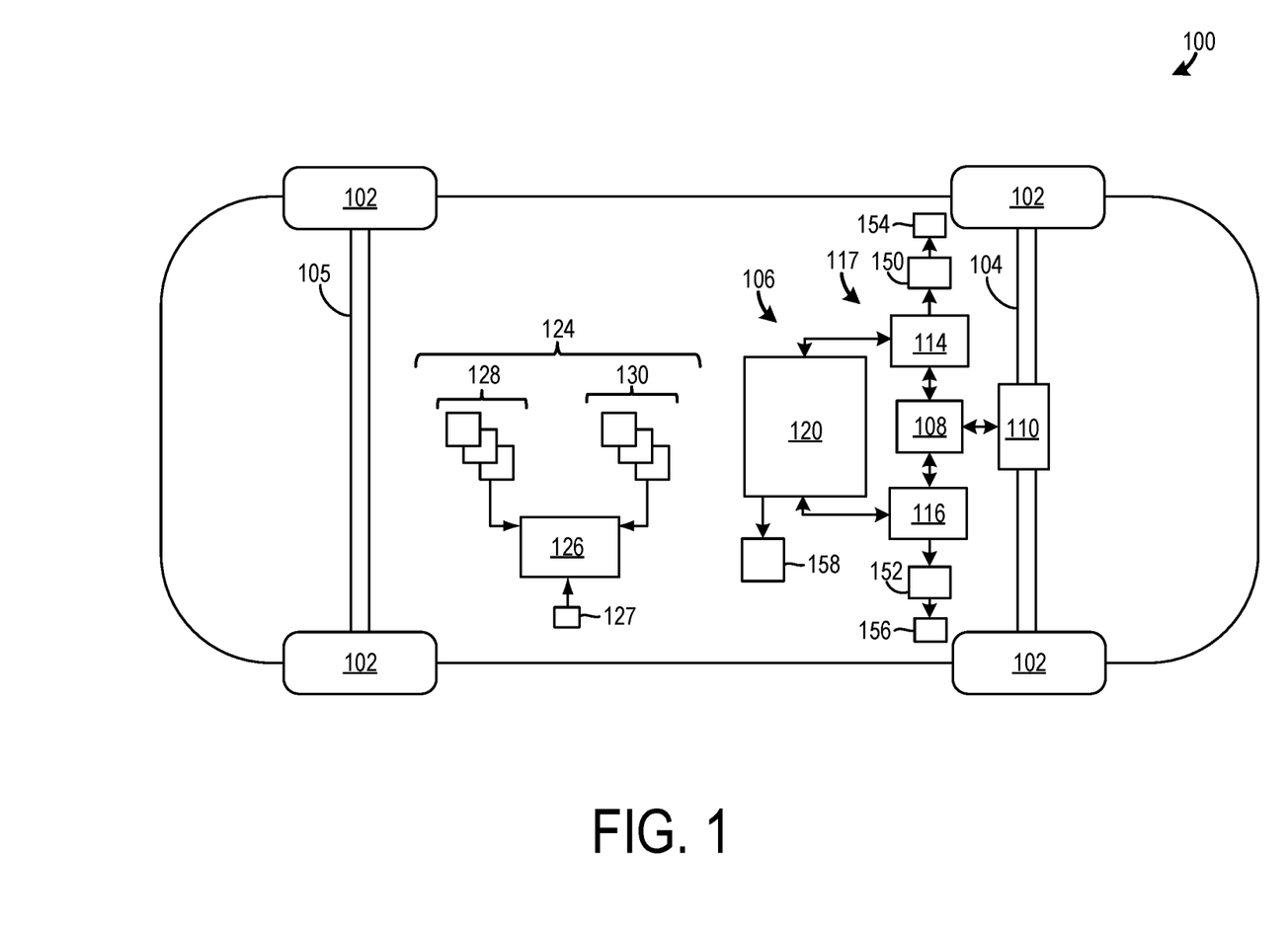
FIG. 1 shows a schematic diagram of an electrical drivetrain (e-drive) of a vehicle.
Figure 2:
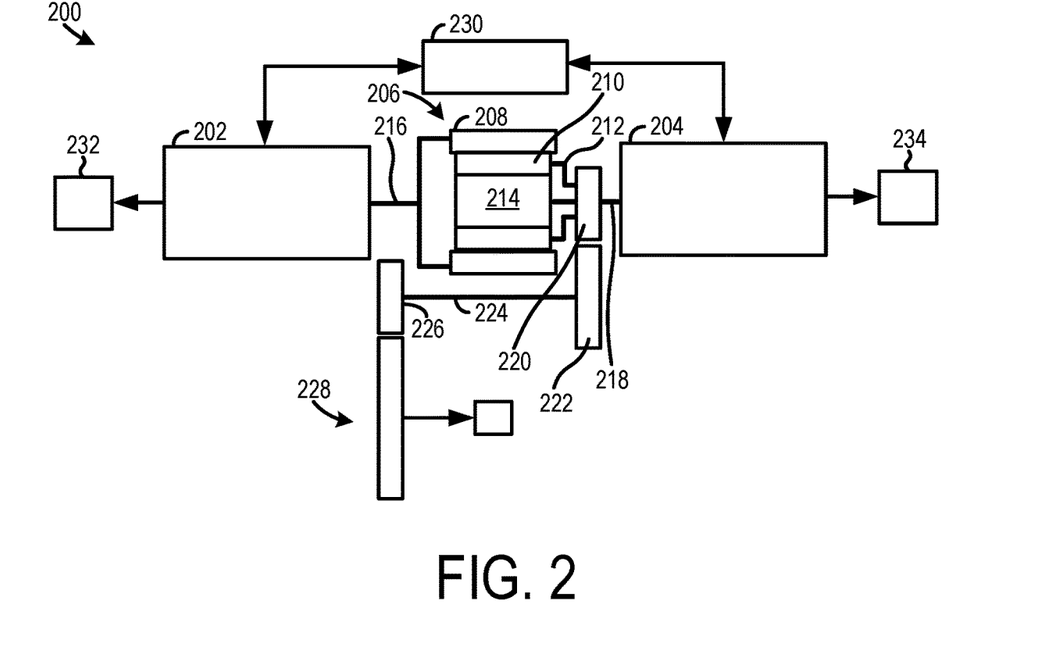
FIG. 2 shows a first example of an electric drivetrain system with a multi-motor arrangement.
Figure 3:
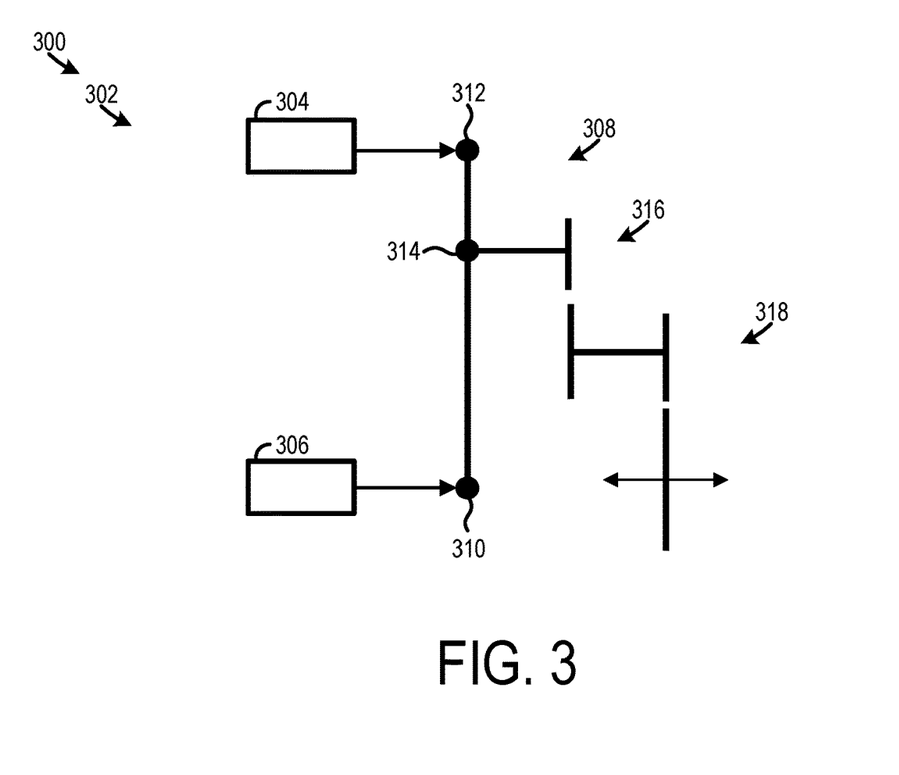
FIG. 3 shows a torque lever diagram of the first example of the electric drivetrain system, depicted in FIG. 2.
Figure 4:
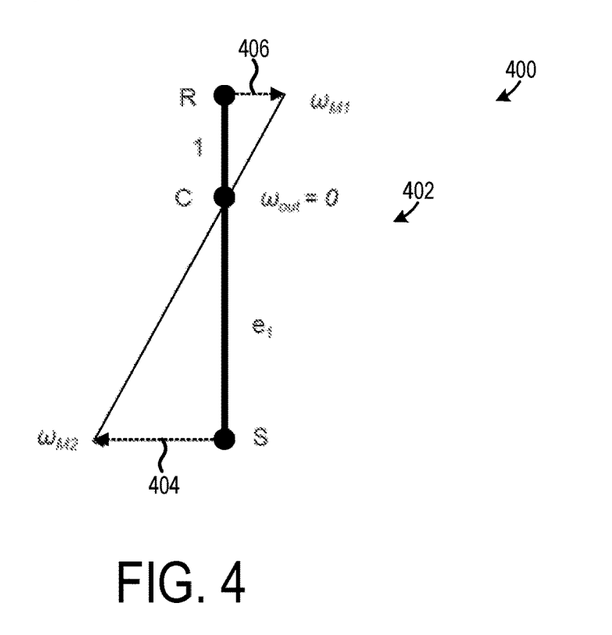
FIG. 4 shows a speed lever diagram of the first example of the electric drivetrain system, depicted in FIG. 2.
Figure 5:
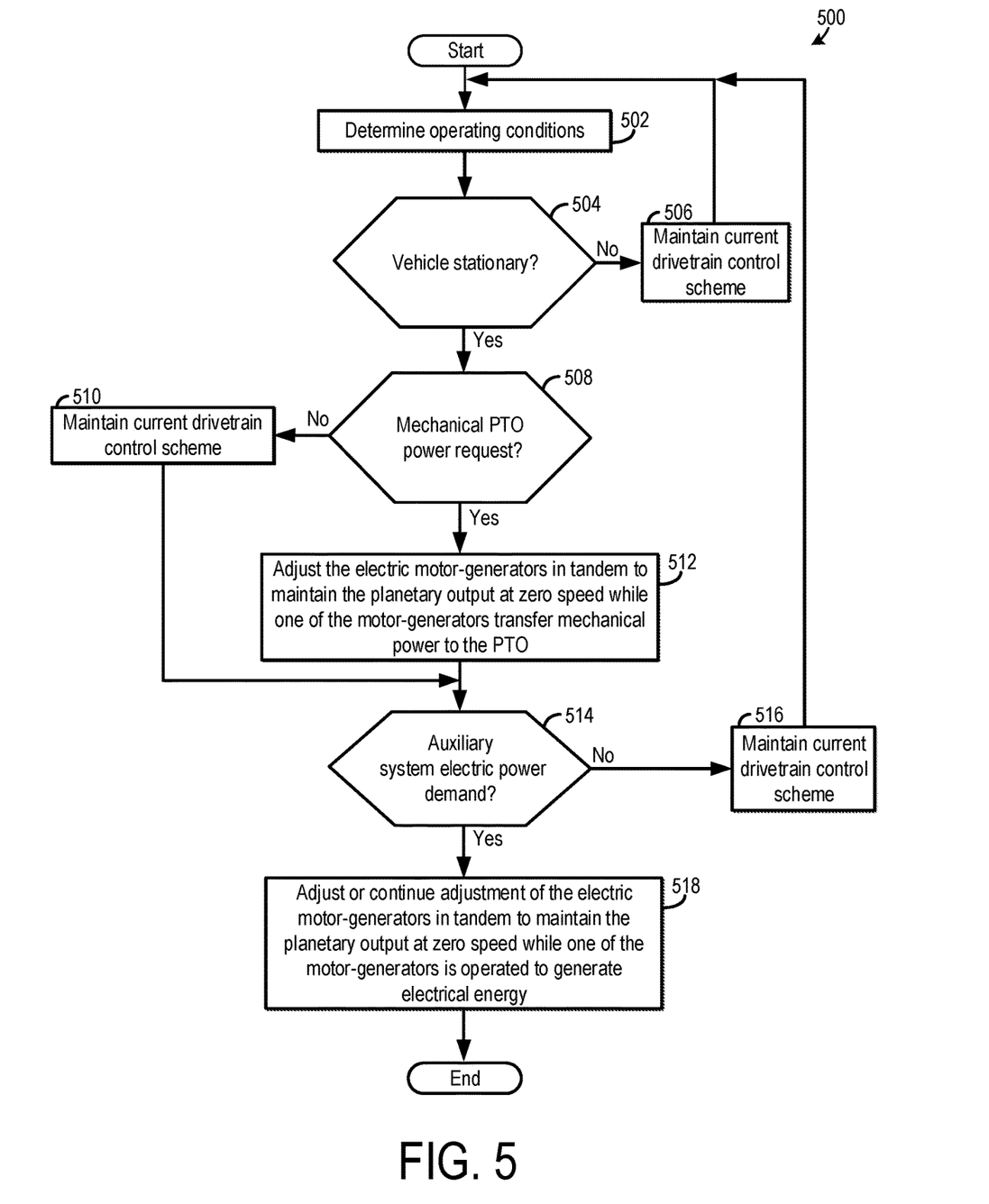
FIG. 5 shows a method for operation of a drivetrain system.
Figure 6:
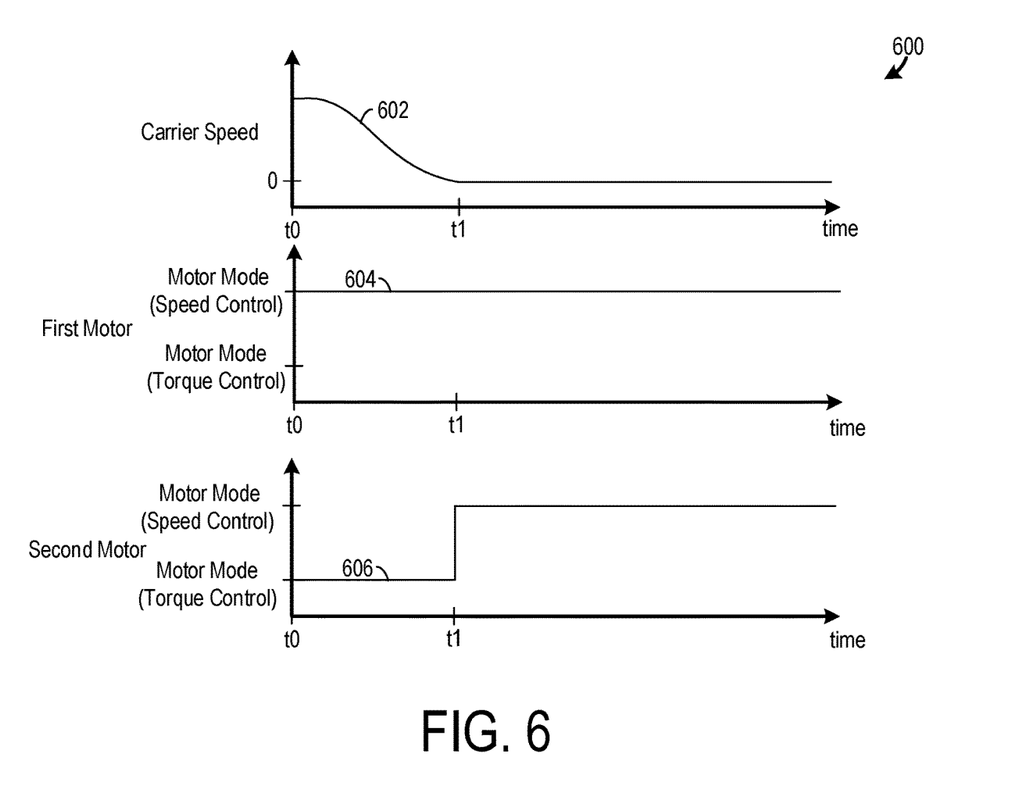
FIG. 6 shows a graphical illustration of a timing diagram for an electric drivetrain control strategy.

FIG. 1 shows a vehicle with a multi-motor drivetrain with an infinitely variable transmission design to efficiently transfer power to mechanical and electrical PTOs. FIGS. 2 and 3 show a first embodiment of a multi-motor drivetrain with an infinitely variable transmission that efficiently combines power from the motors via a planetary gearset. FIG. 4 shows a lever diagram for a stationary power mode of an IVT. FIG. 5 shows a method for strategically delivering power to PTOs while maintain the transmission's output at a zero speed. FIG. 6 shows a use-case timing diagram for a dual motor IVT control strategy.

Turning to FIG. 1, a schematic representation of a vehicle 100 is depicted in FIG. 1 which includes sets of wheels 102 coupled by axles 104, 105 (e.g., pairs of wheels are coupled to one another by the axles). The vehicle may be a light, medium, or heavy duty vehicle. Further, the vehicle may be designed as an off-highway vehicle, in one example. The off-highway vehicle may be of a size that is larger than is allowable on highways and/or unable to travel at a desired speed for highway travel, for instance. The vehicle is illustrated as an electric vehicle (EV). However, in alternate examples, the vehicle may be designed as a hybrid electric vehicle (HEV) where an internal combustion engine provides motive power to the drive wheels in the axle 105. Other examples include various arrangements and positioning of components of the vehicle described below as well as additional components not shown in FIG. 1 for brevity.

A drivetrain 106 of the vehicle 100 may include a transmission 108 coupled to one or more of the axles 104, 105 of vehicle 100. The transmission 108 may be an IVT which provides continuous ratio variability within an infinite ratio range. As such, in the IVT embodiment, the transmission ratio may be set to zero during selected conditions. The transmission 108 is coupled the axle 104 (e.g., a rear axle), as shown in FIG. 1, or to a front axle or to both axles, in other examples. The transmission 108 may be mechanically coupled to a final drive 110 of the drivetrain 106 which, for example, may include a differential, final drive gear reduction, etc. The transmission 108 and final drive 110 may together translate speed and torque from one or more motors to the vehicle wheels 102 to propel vehicle 100.

A first motor-generator 114 and a second motor-generator 116 are coupled to the transmission 108. As such, the motors may operate in drive modes where mechanical power is transferred to the transmission and in generator modes where mechanical power is transferred from the transmission to the motors where electrical energy is generated. Arrows extending between the transmission 108 and the motor-generators 114, 116 indicate the mechanical power transfer capabilities of these components. A group of components including the transmission 108 and the motor-generators 114, 116 may form an electric drivetrain system 117.

An electrically powered auxiliary system 158 may be electrically coupled to the traction battery 120 and/or directly to one or both of the electric motor-generators 114, 116. The electrically powered auxiliary system 158 may be an inverter and an alternative current (A/C) power interface with electrical outlets, an electrically powered pump, an electrically powered air compressor, an electrically powered winch, an electrically powered cabin heater, and the like.

A first mechanical PTO 150 may be rotationally coupled to the first electric motor-generator 114 and a second mechanical PTO 152 may be rotationally coupled to the second electric motor-generator 116. Alternatively, the system 117 may include a single mechanical PTO that may be rotationally coupled to the first and second electric motor-generators. The mechanical PTOs 150, 152 may each be coupled to an auxiliary vehicle system 154,156, respectively. These auxiliary systems may be distinct from one another and may include mechanically driven devices such as a pump, a compressor, a boom, a compactor, a bed lift, and the like.

The first and second electric motor-generators 114, 116 may be electrically coupled to a traction battery 120 of vehicle 100 to both draw power from the traction battery 120 and provide electrical energy to be stored at the traction battery 120. The electric motors may be similarly configured, e.g., having similar operational speed and torque ranges, and thereby referred to as symmetric, or may have different speed and torque outputs, thereby referred to as asymmetric.

Adjustment of the drivetrain between the various modes as well as control of operations within each mode may be executed based on a vehicle control system 124, including a controller 126, as shown in FIG. 1. Controller 126 may be a microcomputer, including components such as a microprocessor unit, input/output ports, an electronic storage medium for executable programs and calibration values, e.g., a read-only memory chip, random access memory, keep alive memory, a data bus, and the like. The storage medium may be programmed with computer readable data representing instructions executable by a processor for performing the methods and control techniques described herein as well as other variants that are anticipated but not specifically listed. In one example, the controller 126 may be a powertrain control module (PCM). However, other suitable types of controller may be used and the specific type of controller used in the vehicle may depend on end-use design parameters of the vehicle.

The controller 126 may receive various signals from sensors 128 coupled to various regions of vehicle 100. For example, the sensors 128 may include sensors at the first and second electric motor-generators 114, 116 to measure motor speed and motor temperature, a pedal position sensor to detect a depression of an operator-actuated pedal, such as an accelerator pedal or a brake pedal, speed sensors at the vehicle wheels 102, etc. An input device 127 (e.g., accelerator pedal, brake pedal, combinations thereof, etc.) may further provide input signals indicative of an operator's intent for vehicle control.

Upon receiving the signals from the various sensors 128 of FIG. 1, the controller 126 processes the received signals, and employs various actuators 130 of vehicle components to adjust the components based on the received signals and instructions stored on the memory of controller 126. For example, the controller 126 may receive an indication of depression of the brake pedal, signaling a desire for decreased vehicle speed. In response, the controller 126 may command operation of at least one of the electric motor-generators as a generator to recharge the traction battery 120. In another example, the controller 126 may receive a throttle pedal signal and responsive to receiving this signal, the controller may command operation of actuators in one or both of the motor-generators 114, 116 to meet the operator's power request. Further, during some operating conditions, the control system may jointly operate the motor generators 114, 116 to hold the output of the transmission at a zero speed, while for example, one or both of the mechanical PTOs 150, 152 is powered via the associated motor. Continuing with such an example, an electrically powered auxiliary system may be powered by operating one of the motor-generators in a generator mode. The control system 124 shown in FIG. 1 may be included in any of the drivetrain system described herein.

The electric drivetrain system may take a variety of forms. As one exemplary embodiment, shown in FIG. 2, an electric drivetrain system 200 with a first electric motor-generator 202 and a second electric motor-generator 204. The drivetrain system 200 shown in FIG. 2 as well as the other drivetrain system discussed herein are examples of the drivetrain system 117, shown in FIG. 1 and the system may therefore have overlapping components, structural features, and/or functional features and repeated description of these features is omitted for brevity.

The first motor-generator 202 and the second motor-generator 204 are rotationally coupled to a planetary assembly 206. In the illustrated example, the planetary assembly 206 is a simple planetary gearset. Alternatively, a Ravigneaux type planetary gearset may be used, in other examples. The simply planetary gearset may less complex, smaller, and less susceptible to degradation than the Ravigneaux type planetary gearset. Ravigneaux style planetary gearsets, however, may provide greater adaptability.

The planetary assembly 206 includes a ring gear 208, planet gears 210 that rotate on a carrier 212, and a sun gear 214. It will be understood that the gears include teeth that mesh with one another to permit power transfer therebetween.

In the illustrated example, the ring gear 208 is coupled to an output shaft 216 of the first electric motor-generator 202 and the sun gear 214 is coupled to an output shaft 218 of the second electric motor-generator 204. Further, in the illustrated example, the carrier 212 functions as the planetary assembly's output. In this way, two motor inputs may be compactly attached to the planetary gearset which may achieve infinite ratio variability.

An output gear 220 is coupled to the carrier 212 and may include an opening to permit the output shaft 218 to be routed therethrough. The output gear 220 may be coupled to a first transfer gear 222 on a transfer shaft 224. A second transfer gear 226 on the transfer shaft 224 may be coupled to a final drive 228. The final drive 228 may include a final gear reduction and a differential that includes sides gears attached to axle shafts.

As shown, the motor-generators 202, 204 and the planetary assembly 206 may be coaxial. This coaxial arrangement may permit the system to achieve a compact packaging that may efficiently mount to an axle assembly. Non-coaxial motor and/or planetary gearset arrangements may be used, in alternate examples, which may however, decrease the system's compactness.

The electric drivetrain system 200 may further include an energy storage device 230 electrically coupled to the first and second motor-generators 202, 204. The energy storage device 230 include one or more batteries, capacitors, combinations thereof, and the like. Thus, during different operating conditions (e.g., motor mode or generator mode) electrical energy may be transferred between the energy storage device 230 and the motor-generators 202, 204.

The electric drivetrain system 200 may further include mechanical PTOs 232, 234 designed to receive mechanical power from the motor-generators 202, 204. The mechanical PTOs may be pumps, lifts, compressors, etc., as previously discussed. In this way, the system's capabilities may be expanded to increase the vehicle's applicability. The PTOs, for example, may be driven when the vehicle is stationary.

FIG. 3 shows a torque lever diagram 300 for a drivetrain system 302 that again includes a first motor-generator 304, a second motor-generator 306, and a planetary gearset 308 with a sun gear 310, a ring gear 312, and planet gears on a carrier 314. In the lever diagram, the gears in the planetary assembly are denoted via nodes. A ring gear to sun gear ratio is denoted by $e_1$. The carrier 314 is connected to transfer gears 316 and a final drive 318 which may be connected to drive wheels.

In the arrangement shown in FIG. 3, the electric motors may be asymmetric (e.g., the electric motors have different operating speed and torque ranges). For example, the first electric motor may be a low speed, high torque device operated in a torque or speed control mode. The second electric motor may be a comparatively high speed, low torque device operated in a speed or control mode. Torques from both electric motors are summed onto a single planetary node, e.g., the carrier, which is configured as an output of the drivetrain. Speeds of each of the motors are decoupled from, e.g., independent of, vehicle speed and when the electric motors are operated in opposite directions, the drivetrain is fully and symmetrically reversible and able to seamlessly switch directions, if desired. In this way drivetrain noise, vibration, and harshness (NVH) may be decreased during gear ratio adjustment in comparison to transmissions with clutches designed to shift between discrete gear ratios.

FIG. 4 shows a speed lever diagram 400 for the planetary assembly 402 with a ring gear R, a carrier C, and a sun gear S. Similar to the other drivetrain systems, the planetary assembly may be coupled to two motors via the ring gear and the sun gear. The speed lever diagram indicates a stationary operating mode where both of the electric motor-generators coupled to the sun and ring gears may be operated using speed control. Specifically, in such an example, the motors may be operated in opposite directions to achieve a zero-speed output. In the speed control mode, the selected motor may be adjusted, using a feedback control strategy, to achieve a speed set-point. The speed of the second motor $\omega_{M2}$ is indicated via arrow 404 and the speed of the first motor $\omega_{M1}$ is indicated via arrow 406. More generally, operating one or both of the motor-generators in a speed control mode includes controlling the selected motor at a speed set-point.

A control equation for the commanded operating speed of the motor-generators is shown in equation 8.

$$\omega_{M2command} = \omega_{carrier}(e_1+1) - \omega_{M1\_target} * e_1 \quad (8)$$

In equation 8, $\omega_{M2command}$ is the commanded operating speed of a selected motor-generator, $\omega_{carrier}$ is a rotational speed of a carrier which is an output of the planetary gearset, and $\omega_{M1\_target}$ is the target speed of the other motor-generator. Equation 8 thereby provides a control law for the first and second motor-generators. Thus, when the drivetrain system is operating in the stationary power mode, the carrier speed $\omega_{carrier}$ may be set to zero and the motor speed commands may be adjusted in speed control modes accordingly. In this way, the planetary gearset's output may be held at a zero speed to maintain the vehicle in a stationary state. While the transmission's output is set to zero speed, one or both of the motors may deliver power to an associated mechanical PTO. Additionally or alternatively, while the output is held at a zero speed, one of the motors may be operated in a generator mode to generate energy for an electrically powered auxiliary system. Specifically, in one use-case scenario, one motor may mechanically power the mechanical PTO while the other motor may electrically power the auxiliary system. Still further in an another use-case example, both of the motors may be set in a generator mode while the output speed is kept at zero to electrically power auxiliary vehicle systems. In this way, the PTOs may be strategically operated while the vehicle is stationary. The system's capabilities are consequently expanded. It will be understood, that the speed control of the motors may be balanced to keep the carrier at a zero speed as well as meet the mechanical and/or electrical power demands of the PTOs.

In other drivetrain system configuration such as in a drive mode, one or both of the motor-generators may be placed in a torque control mode where the selected motor-generator(s) is operated using a commanded torque. Specifically, in the torque control modes the motors may be controlled via a torque lever balance of the drivetrain system, according to equation 9:

$$T_{out} * \omega_{out} = T'_{out} * \omega'_{out} \quad (9)$$

In equation 9, $T_{out}$ and $\omega_{out}$ are the torque output and rotational speed of the first motor and $T'_{out}$ and $\omega'_{out}$ the torque output and rotation speed of the second motor. One of the motors may be torque controlled to prevent overspeed and/or increase system efficiency in a generator mode.

Further, in one example, a step shift mode. In the step shift mode, the system may simulate a kickdown shift effect. To elaborate, when a sudden driver change input occurs (e.g., the accelerator pedal is rapidly depressed), one of the motors may rapidly drop to zero while the other motor quickly moves to another operating point. For instance, in response to a wide open throttle (WOT) maneuver, the torque control mode may drop to zero torque, allowing the speed control mode to rapidly push the torque control motor back to the constant torque region, thereby creating the effect of a kickdown shift. In this way, the operator experience may be enhanced.

A method 500 for operating an electric drivetrain system is shown in FIG. 5. In one example, the method 500 may be implemented by the drivetrain systems described above with regard to FIGS. 1-4 or other suitable drivetrain system, in other examples. Instructions for carrying out the method 500 and the other controls strategies described herein may be executed by a controller, such as the controller 126 of FIG. 1, based on instructions stored in memory of the controller and in conjunction with signals received from vehicle sensors. The controller may employ actuators of the drivetrain system to adjust vehicle operation, according to the method described below.

At 502, the method includes determining (e.g., estimating, modeling, and/or measuring) operating conditions of an electric drivetrain system. These conditions may include vehicle speed, motor speed, motor torque, motor temperature battery state of charge (SOC), and the like.

Next at 504, the method judges if the vehicle is stationary. For instance, the controller may determine if the vehicle is stationary when signals from a speed sensor coupled to the output of the drivetrain are indicative of a zero value.

If the vehicle is not stationary (NO at 504) the method moves to 506 where the method includes maintaining the current drivetrain control scheme. For instance, the motors in the drivetrain system may be operated in speed and/or torque control modes to achieve an operator power request.

Conversely, if the vehicle is stationary (YES at 504) the method proceeds to 508. At 508, the method includes determining if a power request from the mechanical PTO is present. A load on the mechanical PTO may be used to judge if there is a mechanical power request. For instance, if the load is greater than a threshold (e.g., greater than zero or a positive non-zero value). In other examples, the auxiliary system coupled to the mechanical PTO may communicate with the controller to influence the power request judgement.

If there is not a power request from the mechanical PTO (NO at 510), the method moves to 510 where the method includes maintaining the current drivetrain control scheme. For example, shutdown of the motors in the drivetrain system may be sustained to keep the vehicle stationary.

Conversely, if there is a power request from the mechanical PTO (YES at 510), the method moves to 512 where the method includes adjusting the electric motor-generators in tandem to maintain the planetary output at zero speed while one of the motor-generators transfers mechanical power to the PTO. For instance, both motors may be speed controlled to maintain the speed of the carrier which serves as the planetary assembly's output at or approaching zero.

At 514, the method determines if there is an electric power demand from an auxiliary system. For instance, if an electrical load from the auxiliary system at an electrical interface is sensed via the controller, it may be determined that there is an electrical power demand.

If it is determined that an electric power demand is not present (NO at 514), the method moves to 516 where the current drivetrain control scheme is maintained. For instance, operation of one of the motors to deliver power to a mechanical PTO may be sustained.

On the other hand, if it is determined that an electric power demand is present (YES at 514), the method moves to 518 where the method includes adjusting or continuing adjustment of the electric motor-generators in tandem to maintain the planetary output at zero speed while one of the motor-generators is operated to generate electrical energy. Method 500 permits power to be efficiently directed to one or more PTOs from the motors while the vehicle is stationary. Consequently, the system's capabilities with regard to auxiliary equipment is expanded.

FIG. 6 illustrates a timing diagram 600 of a use-case control strategy for a transmission system, such as the drivetrain system shown in FIGS. 1-4. However, the control strategy may be carried out in other suitable electric drivetrains. In each graph of the timing diagram, time is indicated on the abscissa. The ordinate for plot 602 indicates the speed of the carrier in the planetary assembly that may correspond to the transmission's output speed. The ordinates for plots 604 and 606 indicate the operating modality of the motors (i.e., "Motor Mode (Speed Control)" and "Motor Mode (Torque Control)").

Prior to t1, the first motor operates in a speed control mode and the second motor operates in a torque control mode. Thus, prior to t1, the motors in the electric drive may be controlled to achieve a desired efficiency or to prevent over-speed. At t1, the carrier speed reaches zero. Responsive the carrier reaching a zero speed, the second motor may be placed in the speed control mode which permits the carrier to be held at zero. After t1, the motors are held in speed control mode but can be operated to provide mechanical power to a PTO. In this way, the vehicle may effectively transition to a mode where the motors power PTOs while the vehicle is at standstill.

The technical effect of the control methods for the drivetrains described herein it to efficiently provide electrical and mechanical power to auxiliary vehicle systems. Another technical effect of the electric drivetrain control methods set forth herein is to increase the applicability of the auxiliary systems during vehicle.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further discussed in the following paragraphs. In one aspect, an electric drivetrain system is provided that comprises a first electric motor-generator and a second electric motor-generator rotationally coupled to a planetary assembly that is rotationally coupled to a drive axle via an output gear; and a controller including instructions that when executed, during a first operating condition, cause the controller to: operate each of the first and second electric motor-generators in a motor mode or a generator mode and hold the output gear at a zero speed.

In another aspect, a method for operating an electric drivetrain system in a vehicle is provided that comprises under a first operating condition, holding an output gear of a planetary gearset at zero; operating a first electric motor-generator in one of a motor mode or a generator mode; and operating a second electric motor-generator in one of a motor mode or a generator mode, wherein the first and second electric motor-generators are input coupled to the planetary gearset and the output gear of the planetary gearset is coupled to a differential.

In yet another aspect, an electric drivetrain system is provided that comprises a first electric motor-generator rotationally coupled to a ring gear of a planetary gearset; a second electric motor-generator rotationally coupled to a sun gear of the planetary gearset, wherein the planetary gearset includes a carrier rotationally coupled to a drive axle via an output gear; and a controller including instructions that when executed, during a first operating condition, cause the controller to: operate the first and second electric motor-generators in a motor mode and/or a generator mode and hold the carrier at zero speed.

In any of the aspects or combinations of the aspects, operating each of the first and second electric motor-generators in a motor mode or generator mode may include operating the first electric motor-generator in the motor mode and transferring mechanical power from the first electric motor-generator to a mechanical power take-off.

In any of the aspects or combinations of the aspects, operating each of the first and second electric motor-generators in a motor mode or generator mode may include operating the second electric motor-generator in the generator mode and transferring electrical energy to an electrically powered auxiliary vehicle system.

In any of the aspects or combinations of the aspects, operating each of the first and second electric motor-generators in the motor mode or the generator mode may include operating the first and second electric motor-generators each in a speed control mode where a motor output speed is adjusted based on a set-point.

In any of the aspects or combinations of the aspects, the first operating condition may be a condition where vehicle speed is at or approaching zero.

In any of the aspects or combinations of the aspects, the first electric motor-generator may be coupled to a ring gear in the planetary assembly and the second electric motor-generator is coupled to a sun gear in the planetary assembly.

In any of the aspects or combinations of the aspects, operating each of the first and second electric motor-generators in the motor mode or the generator mode may include rotating the first and second electric motor-generators in opposite directions.

In any of the aspects or combinations of the aspects, the first electric motor-generator, the second electric motor-generator, and the planetary assembly may be coaxially arranged.

In any of the aspects or combinations of the aspects, the first operating condition may be a condition where the output gear of the planetary gearset is zero.

In any of the aspects or combinations of the aspects, operating the first and second electric motor-generators in one of the motor mode and the generator mode may include operating the first and second electric motor-generators in speed control modes where outputs of the first and second electric motor-generators are adjusted based on a speed set-point.

In any of the aspects or combinations of the aspects, the first electric motor-generator may be rotationally coupled to a mechanical power take-off and wherein operating the first electric motor-generator in the motor mode may include transfer mechanical power to the mechanical power take-off.

In any of the aspects or combinations of the aspects, operating the second electric motor-generator in the generator mode may include transferring electrical energy from the second electric motor-generator to an electrically powered auxiliary vehicle system.

In any of the aspects or combinations of the aspects, operating the first and second electric motor-generators in one of the motor mode or the generator mode may include rotating the first and second electric motor-generators in opposite directions.

In any of the aspects or combinations of the aspects, the electric drivetrain system may further comprise a mechanical power take-off rotationally coupled to the first electric motor-generator.

In any of the aspects or combinations of the aspects, operating the first electric motor-generator in the motor mode may include adjusting the first electric motor-generator in a speed control mode and transferring mechanical power to the mechanical power take-off from the first electric motor-generator.

In any of the aspects or combinations of the aspects, operating the second electric motor-generator in the generator mode may include adjusting the first electric motor-generator in a speed control mode and transferring electrical energy from the second electric motor-generator to an electrically powered auxiliary vehicle system.

In any of the aspects or combinations of the aspects, operating the first and second electric motor-generators in the motor mode and/or the generator mode may include operating the first and second electric motor-generators each in a speed control mode to hold the carrier at zero speed.

In another representation, an infinitely variable electric transmission system is provided that includes: a planetary gearset without clutches; and two asymmetrically sized motors that are coupled to a ring gear and a sun gear in the planetary gearset, wherein a carrier of the planetary gearset is coupled to a final drive and a controller including instructions that when executed while the carrier is held at a zero speed cause the controller to transfer mechanical energy from one or more of the motors to a mechanical power take-off.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other powertrain hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various powertrain hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drivetrain system, comprising:
a first electric motor-generator and a second electric motor-generator rotationally coupled to a planetary assembly that is rotationally coupled to a drive axle via an output gear; and
a controller including instructions that when executed, during a first operating condition, cause the controller to:
operate each of the first and second electric motor-generators in a motor mode or a generator mode and hold the output gear at a zero speed.

2. The electric drivetrain system of claim 1, wherein operating each of the first and second electric motor-generators in the motor mode or generator mode includes operating the first electric motor-generator in the motor mode and transferring mechanical power from the first electric motor-generator to a mechanical power take-off.

3. The electric drivetrain system of claim 2, wherein operating each of the first and second electric motor-generators in the motor mode or generator mode includes operating the second electric motor-generator in the generator mode and transferring electrical energy to an electrically powered auxiliary vehicle system.

4. The electric drivetrain system of claim 1, wherein operating each of the first and second electric motor-generators in the motor mode or the generator mode includes operating the first and second electric motor-generators each in a speed control mode where a motor output speed is adjusted based on a set-point.

5. The electric drivetrain system of claim 1, wherein the output gear is a carrier.

6. The electric drivetrain system of claim 1, wherein the first operating condition is a condition where vehicle speed is at or approaching zero.

7. The electric drivetrain system of claim 1, wherein the first electric motor-generator is coupled to a ring gear in the planetary assembly and the second electric motor-generator is coupled to a sun gear in the planetary assembly.

8. The electric drivetrain system of claim 7, wherein operating each of the first and second electric motor-generators in the motor mode or the generator mode includes rotating the first and second electric motor-generators in opposite directions.

9. The electric drivetrain system of claim 1, wherein the first electric motor-generator, the second electric motor-generator, and the planetary assembly are coaxially arranged.

10. A method for operating an electric drivetrain system in a vehicle, comprising:
under a first operating condition, holding an output gear of a planetary gearset at zero;
operating a first electric motor-generator in one of a motor mode or a generator mode; and
operating a second electric motor-generator in one of a motor mode or a generator mode, wherein the first and second electric motor-generators are input coupled to the planetary gearset and the output gear of the planetary gearset is coupled to a differential.

11. The method of claim 10, wherein the first operating condition is a condition where the output gear of the planetary gearset is zero.

12. The method of claim 10, wherein operating the first and second electric motor-generators in one of the motor mode and the generator mode includes operating the first and second electric motor-generators in speed control modes where outputs of the first and second electric motor-generators are adjusted based on a speed set-point.

13. The method of claim 10, wherein the first electric motor-generator is rotationally coupled to a mechanical power take-off and wherein operating the first electric motor-generator in the motor mode includes transfer mechanical power to the mechanical power take-off.

14. The method of claim 10, wherein operating the second electric motor-generator in the generator mode includes transferring electrical energy from the second electric motor-generator to an electrically powered auxiliary vehicle system.

15. The method of claim 10, wherein operating the first and second electric motor-generators in one of the motor mode or the generator mode includes rotating the first and second electric motor-generators in opposite directions.

16. An electric drivetrain system, comprising:
a first electric motor-generator rotationally coupled to a ring gear of a planetary gearset;
a second electric motor-generator rotationally coupled to a sun gear of the planetary gearset, wherein the planetary gearset includes a carrier rotationally coupled to a drive axle via an output gear; and a controller including instructions that when executed, during a first operating condition, cause the controller to:
  operate the first and second electric motor-generators in a motor mode and/or a generator mode and hold the carrier at zero speed.

17. The electric drivetrain system of claim 16, further comprising a mechanical power take-off rotationally coupled to the first electric motor-generator.

18. The electric drivetrain system of claim 17, wherein operating the first electric motor-generator in the motor mode includes adjusting the first electric motor-generator in a speed control mode and transferring mechanical power to the mechanical power take-off from the first electric motor-generator.

19. The electric drivetrain system of claim 18, wherein operating the second electric motor-generator in the generator mode includes adjusting the first electric motor-generator in a speed control mode and transferring electrical energy from the second electric motor-generator to an electrically powered auxiliary vehicle system.

20. The electric drivetrain system of claim 16, wherein operating the first and second electric motor-generators in the motor mode and/or the generator mode includes operating the first and second electric motor-generators each in a speed control mode to hold the carrier at zero speed.

* * * * *